(12) United States Patent
Kakio et al.

(10) Patent No.: US 11,537,339 B2
(45) Date of Patent: Dec. 27, 2022

(54) PRINT CONTROL SERVER AND PRINT CONTROL METHOD

(71) Applicant: Seiko Epson Corporation, Tokyo (JP)

(72) Inventors: Ryosuke Kakio, Matsumoto (JP); Takashi Sera, Shiojiri (JP); Yosuke Kawakami, Matsumoto (JP); Yuma Kitahara, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/480,428

(22) Filed: Sep. 21, 2021

(65) Prior Publication Data

US 2022/0091802 A1 Mar. 24, 2022

(30) Foreign Application Priority Data

Sep. 23, 2020 (JP) .............................. JP2020-158304

(51) Int. Cl.
*G06F 3/12* (2006.01)
*H04L 51/52* (2022.01)

(52) U.S. Cl.
CPC .......... *G06F 3/1238* (2013.01); *G06F 3/1204* (2013.01); *G06F 3/1239* (2013.01); *H04L 51/52* (2022.05)

(58) Field of Classification Search
None
See application file for complete search history.

(56) References Cited

U.S. PATENT DOCUMENTS

| 2009/0059276 | A1* | 3/2009 | Matsuo | G06F 21/608 358/1.15 |
| 2017/0280012 | A1* | 9/2017 | Matsuo | H04N 1/393 |
| 2020/0133592 | A1* | 4/2020 | Mitsuhashi | G06F 3/1226 |
| 2021/0099612 | A1* | 4/2021 | Tashiro | H04N 1/444 |

FOREIGN PATENT DOCUMENTS

JP 2020-071598 5/2020

* cited by examiner

*Primary Examiner* — Frantz Bataille
(74) *Attorney, Agent, or Firm* — Workman Nydegger

(57) ABSTRACT

A print control server includes a detector that detects a print instruction or a setting instruction entered by the user in the chat system provided by the SNS, a print controller that executes printing using a printer in accordance with the print instruction or configures a setting relating to the printer in accordance with the setting instruction, and a manager that associates identification information of the user with a privilege of the user in the chat system and stores the identification information and the privilege of the user. The print controller references the information stored by the manager to identify the privilege associated with the identification information of the user who has entered the print instruction or the setting instruction, and limits, based on the identified privilege, the printing to be executed in accordance with the print instruction or the setting to be configured in accordance with the setting instruction.

6 Claims, 3 Drawing Sheets

| USER IDENTIFICATION INFORMATION | PRIVILEGE |
|---|---|
| U1****** | 1 |
| U2****** | 2 |
| U3****** | 3 |
| ...... | ...... |

| USER IDENTIFICATION INFORMATION | PRIVILEGE | PRINTER IDENTIFICATION INFORMATION |
|---|---|---|
| U1****** | 1 | abcd@print.··· |
| U2****** | 2 | abcd@print.··· |
| U3****** | 3 | abcd@print.··· |
| ...... | ...... | abcd@print.··· |

PRINT CONTROL SERVER AND PRINT CONTROL METHOD

The present application is based on, and claims priority from JP Application Serial Number 2020-158304, filed Sep. 23, 2020, the disclosure of which is hereby incorporated by reference herein in its entirety.

BACKGROUND

1. Technical Field

The present disclosure relates to a print control server and a print control method.

2. Related Art

A user who uses a social networking service (hereinafter referred to as SNS) can post a file such as a text or a picture to a chat system provided by the SNS and publish the file to another user who participates in the same group chat. In addition, the user can use a printing system coupled to the SNS via a network to print the file posted to the SNS with a printer registered in the printing system in advance.

In addition, the following information processing device has been disclosed (refer to JP-A-2020-71598). That is, when a print instruction is posted to a chat room by a user whose printer is not registered, a message requesting the printer to be registered is posted to the chat room, and the user posts the printer ID to the chat room in response to the posting of the message, the information processing device associates the printer ID with the user, registers the printer ID and the user, and executes printing using the registered printer.

In existing techniques, each of users who are members of a group chat can use a printer uniformly. Therefore, the cost of printing may increase and settings relating to printing may be freely changed at the discretion of each of the users.

SUMMARY

A print control server includes a detector that detects a print instruction entered by a user in a chat system provided by an SNS or detects a setting instruction entered by the user in the chat system provided by the SNS, a print controller that executes printing using a printer in accordance with the print instruction or configures a setting relating to the printer in accordance with the setting instruction, and a manager that associates identification information of the user with a privilege of the user in the chat system and stores the identification information and the privilege of the user. The print controller references the information stored by the manager to identify the privilege associated with the identification information of the user who has entered the print instruction or the setting instruction. The print controller limits, based on the identified privilege, the printing to be executed in accordance with the print instruction or the setting to be configured in accordance with the setting instruction.

A print control method includes a detection process of detecting a print instruction entered by a user in a chat system provided by an SNS or detecting a setting instruction entered by the user in the chat system provided by the SNS, a print control process of executing printing using a printer in accordance with the print instruction or configuring a setting relating to the printer in accordance with the setting instruction, and a management process of associating identification information of the user with a privilege of the user in the chat system and storing the identification information and the privilege of the user. The print control process references the information stored by the management process to identify the privilege associated with the identification information of the user who has entered the print instruction or the setting instruction. The print control process limits, based on the identified privilege, the printing to be executed in accordance with the print instruction or the setting to be configured in accordance with the setting instruction.

BRIEF DESCRIPTION OF THE DRAWINGS

FIG. 2A is a diagram illustrating a user DB stored in an SNS server.

FIG. 2B is a diagram illustrating a user DB stored in a print control server.

DESCRIPTION OF EXEMPLARY EMBODIMENTS

Hereinafter, an embodiment of the present disclosure is described with reference to the drawings. The drawings merely illustrate examples to explain the embodiment. Since the drawings illustrate the examples, ratios and shapes may not be correct and may not be consistent with each other and a portion may be omitted.

1. System Configuration

Figure 1:
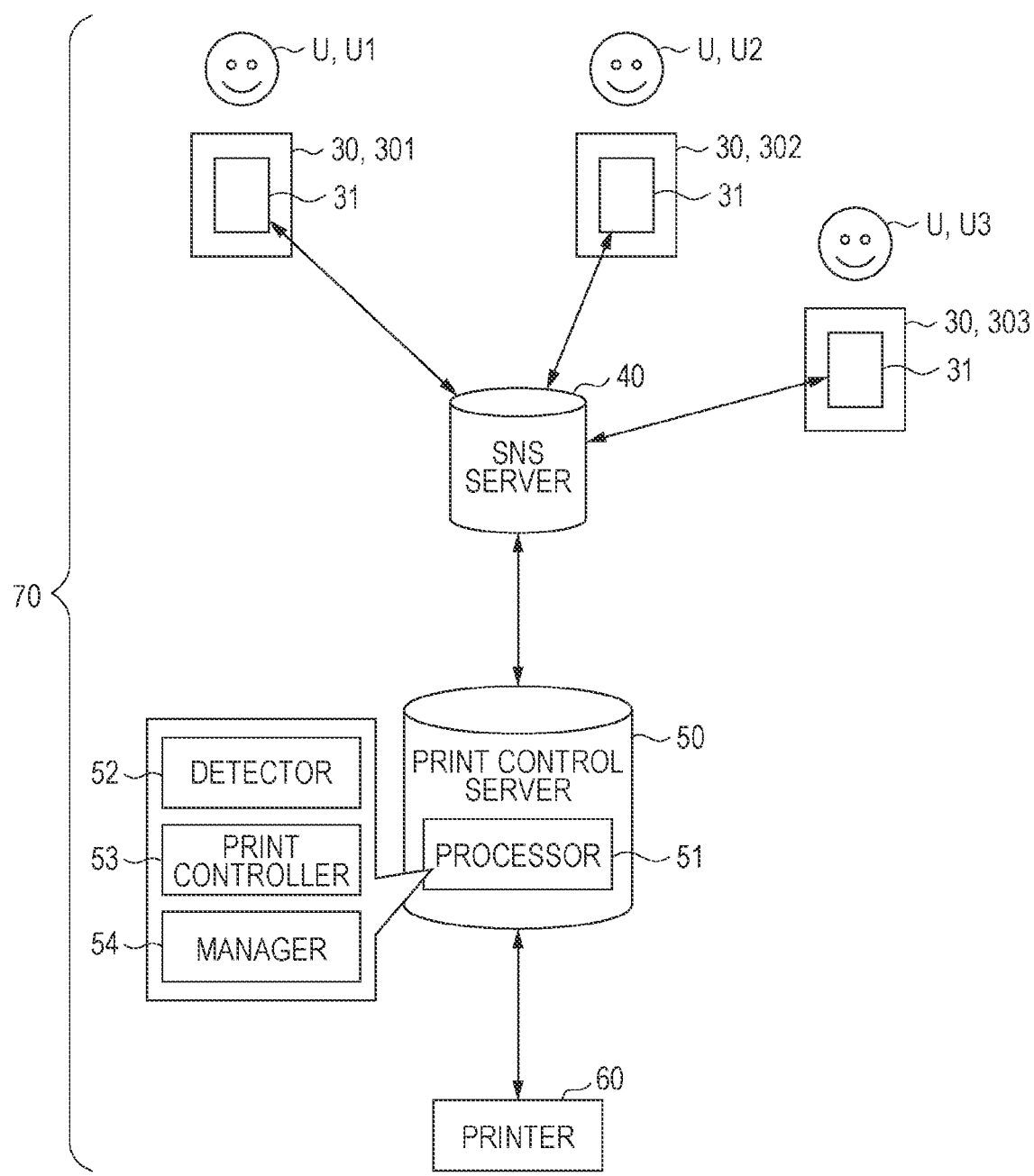
FIG. 1 is a schematic block diagram illustrating a system.

FIG. 1 is a schematic block diagram illustrating a configuration of a system 70 according to the embodiment. At least a part of the system 70 may be referred to as printing system. According to FIG. 1, the system 70 includes a plurality of terminal devices 30, a plurality of servers 40 and 50, and a printer 60. The terminal devices 30, the servers 40 and 50, and the printer 60 are coupled to and able to communicate with each other via the Internet when necessary, as illustrated in FIG. 1.

Figure 3:
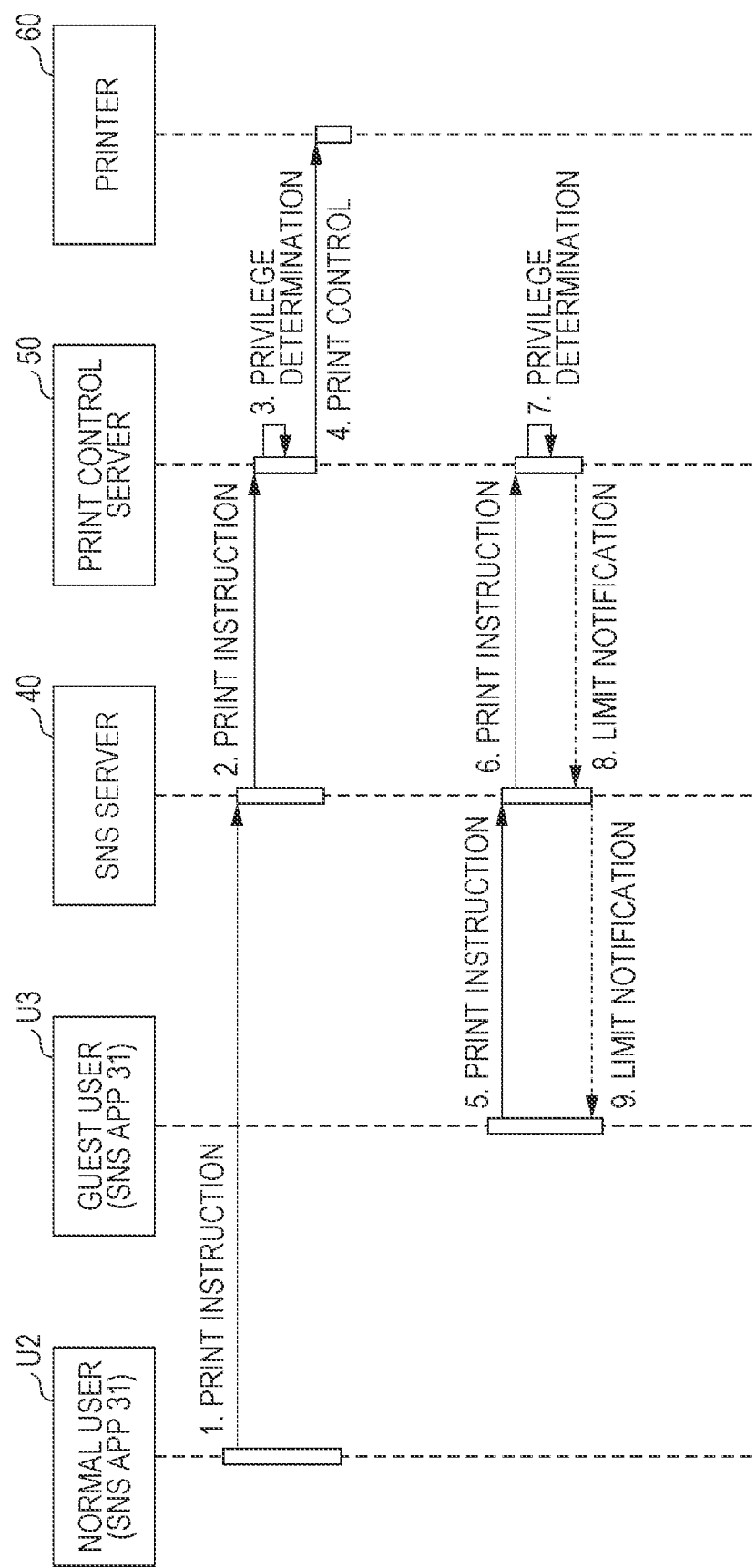
FIG. 3 is a sequence diagram illustrating a print control process.

The terminal devices 30 are communication devices that are operated by users U. The terminal devices 30 are, for example, smartphones, tablet terminals, personal computers (PCs), or the like. Some applications are installed in each of the terminal devices 30. In the example illustrated in FIG. 1, as an example of an application, an SNS application 31 for use of a certain SNS is installed in each of the terminal devices 30. The certain SNS is hereinafter merely referred to as SNS. In FIG. 3, the SNS application 31 is abbreviated to SNS APP 31.

That is, the users U are users of the SNS. Each of the users U has their own account for the SNS in advance. The accounts are identification information identifying the users in the SNS and include user IDs, passwords, and other personal information. FIG. 1 illustrates terminal devices 301, 302, 303, . . . as the terminal devices 30 in order to distinguish the terminal devices 30 for convenience. FIG. 1 also illustrates users U1, U2, U3, . . . as the users U who use the terminal devices 301, 302, 303, . . . in order to distinguish the users U. The users U use the SNS by logging in to the SNS application 31 activated in the terminal devices 30 using the users' accounts.

The SNS server 40 is one or multiple servers for providing the SNS on the Internet. The SNS server 40 and the SNS application 31 collaborate with each other, thereby providing the SNS to the users having the accounts. In the embodiment, the SNS server 40 provides a chat system as one of services to the users U. Each of the users U can participate in a certain group chat in the chat system and chat with the other users belonging to the common group chat. The group chat may be referred to as channel or work space.

The print control server 50 can control printing via the SNS. The print control server 50 is one or multiple servers that cause, based on an entry of a print instruction by a user U in the chat system, the printer 60 associated with the user U to execute printing or that configure a setting relating to the printer 60 based on an entry of a setting instruction by the user U in the chat system. The print control server 50 enables a print control method. The SNS application 31 communicates information necessary for printing with the print control server 50 via an application programming interface (API) provided by the SNS server 40. A processor 51 that controls the print control server 50 functions as a detector 52, a print controller 53, a manager 54, and the like.

FIG. 1 illustrates the one printer 60. However, a plurality of printers that can be used by the print control server 50 via the Internet may be present.

2. Print Control Process with Limit Based on Privilege of User

A user U can activate the SNS application 31 and operate a terminal device 30 to perform an entry process in accordance with a predetermined rule for the chat system provided by the SNS server 40 and create a group chat in the chat system. The user U who has created the group chat is hereinafter referred to as "administrative user" in the sense that the user manages the group chat. For example, the user U1 is the administrative user.

The administrative user U1 can invite the other users U to the group chat in accordance with a predetermined rule for the chat system and register the other users U as members. In this case, the administrative user U1 can give a privilege to each of the other users U. In the following description, it is assumed that the users U registered for the group chat are "normal users" to which the same privilege as that of the administrative user U1 is given for use of the chat system, and "gest users" to which a privilege lower than that of the administrative user U1 is given for use of the chat system.

It is assumed that the normal users are users U having a close relationship with the administrative user U1 in terms of, for example, a company or a family. It is assumed that the gest users are users U who do not have such a close relationship with the administrative user U1 as the relationship between the normal users and the administrative user U1 but need to temporarily participate in the group chat. In the following description, it is assumed that the user U2 is one of the normal users and that the user U3 is one of the gest users.

FIG. 2A illustrates an example of a user database 41 in which association relationships between users U registered for a certain group chat and privileges are defined. The word "database" is abbreviated to DB. The user DB 41 is stored in the SNS server 40. In the user DB 41, association relationships between identification information of the users U and privileges for the chat system are defined. The identification information defined in the user DB 41 is, for example, user IDs assigned to the users U for the SNS. In this example, a user ID "U1****" corresponds to the user U1, a user ID "U2**" corresponds to the user U2, and a user ID "U3****" corresponds to the user U3.

A privilege "1" indicates the administrative user. A privilege "2" indicates a normal user. A privilege "3" indicates a gest user. Levels of the privileges "1" and "2" are not different. However, the level of the privilege "1" may be higher than the level of the privilege "2". For example, the user DB 41 is generated and stored in the SNS server 40 based on an entry by the administrative user U1 in the chat system via the terminal device 301.

The administrative user U1 can update the user DB 41 at any time. That is, the administrative user U1 notifies the SNS server 40 of an increase, a decrease, or a change in the number of normal users or the number of gest users in the group chat at any time. The SNS server 40 can update the state of the user DB 41 in accordance with the notification. The user DB 41 may be updated by an operation of the normal user U2 or an operation of the gest user U3.

The manager 54 of the print control server 50 stores the association relationships between the users U of the group chat and the privileges for the group chat to a storage region of the print control server 50. Specifically, the manager 54 acquires the user DB 41 stored in the SNS server 40 from the SNS server 40 and stores the user DB 41 as a user DB 55. FIG. 2B illustrates an example of the user DB 55 stored in the print control server 50. In the example illustrated in FIG. 2B, the user DB 55 is obtained by adding printer identification information for each of the users U to the user DB 41. The printer identification information is identification information specific to each printer 60 recognized by the print control server 50 via a network and is, for example, an email address assigned to each printer 60.

In the example illustrated in FIG. 2B, common printer identification information is associated with each user U belonging to the same group chat. When the administrative user U1 creates a group chat in the chat system and arbitrarily specifies a printer 60, the group chat is associated with the printer 60. Specifically, the print control server 50 acquires, via the SNS server 40, an association relationship between the group chat and the printer 60 specified by the administrative user U1, associates the identification information of the printer 60 with the user DB 55 for the group chat, and registers the identification information in association with the user DB 55.

As described above, the user DB 41 may be updated. Therefore, every time the user DB 41 is updated, the SNS server 40 may notify the print control server 50 of a detail of the update and may update the user DB 55 stored in the print control server 50 in synchronization with the update of the user DB 41.

Next, a print control process according to the embodiment is described on the assumption that the user DB 55 is already stored in the print control server 50.

FIG. 3 is a sequence diagram illustrating processes by the configurations relating to the print control process and included in the system 70. In FIG. 3, a process by the normal user U2 is a process that is executed by the normal user U2 operating the terminal device 302 with the SNS application 31 activated therein and using the account of the normal user U2. In FIG. 3, a process by the gest user U3 is a process that is executed by the gest user U3 operating the terminal device 303 with the SNS application 31 activated therein and using the account of the gest user U3.

The normal user U2 enters a print instruction to print an arbitrary file in a group chat to which the normal user U2 belongs in the chat system ("1. print instruction"). Specifically, the print instruction is posted by the normal user U2 to the chat system and received by the SNS server 40.

Next, as understood from a description of "2. print instruction", the print instruction received by the SNS server 40 is transmitted from the SNS server 40 to the print control server 50. The SNS server 40 transmits, to the print control server 50, the print instruction from the user U together with at least a part of identification information of the user U who has entered the print instruction. In this case, the SNS server 40 transmits the print instruction and a user ID of the user U to the print control server 50.

The detector 52 of the print control server 50 receives, via the SNS server 40, the print instruction entered by the normal user U2, thereby detecting the print instruction. The print controller 53 of the print control server 50 executes "3. privilege determination" based on the user ID relating to the print instruction detected by the detector 52. Specifically, the print controller 53 references the user DB 55 to identify a privilege associated with the user ID and determines whether the identified privilege is the privilege "3" indicating a gest user. According to the user DB 55, the privilege associated with the user ID of the normal user U2 is the privilege "2". Therefore, in "3. privilege determination", the print controller 53 determines that the identified privilege is not a privilege of a gest user or is a privilege that does not require a limit. After that, the print controller 53 executes "4. print control".

In "4. print control", the print controller 53 references the user DB 55 to identify, based on the printer identification information, the printer 60 associated with the normal user U2 who has entered the print instruction, and causes the identified printer 60 to print the file in accordance with the print instruction.

In the processes that are illustrated in FIG. 3 and executed in accordance with the print instruction entered by the normal user U2, the normal user U2 and the privilege "2" may be read and interpreted as the administrative user U1 and the privilege "1", respectively.

When the gest user U3 enters a print instruction to print any file in a group chat to which the gest user U3 belongs in the chat system ("5. print instruction"), the print instruction received by the SNS server 40 from the gest user U3 is transmitted from the SNS server 40 to the print control server 50, as understood from a description of "6. print instruction".

The detector 52 of the print control server 50 receives, via the SNS server 40, the print instruction entered by the gest user U3, thereby detecting the print instruction. The print controller 53 of the print control server 50 executes "7. privilege determination" based on the user ID relating to the print instruction detected by the detector 52. In "7. privilege determination", a determination result different from the result of "3. privilege determination" is obtained. According to the user DB 55, the privilege associated with the user ID of the gest user U3 is the privilege "3". Therefore, the print controller 53 determines the privilege of the gest user or a privilege that requires a limit.

When the print controller 53 makes the foregoing determination, the print controller 53 limits printing to be executed in accordance with the print instruction. In this case, the limit on the printing is the prohibition of the printing. Specifically, when the print controller 53 determines the privilege of the gest user based on the user ID relating to the print instruction, the print controller 53 does not cause the printer 60 to execute printing in accordance with the print instruction. When the print controller 53 limits the printing to be executed in accordance with the print instruction, the print controller 53 may execute "8. limit notification", as indicated by a broken-line arrow in FIG. 3. The limit notification is executed to provide, to the user U who has entered the print instruction, a notification indicating that the printing to be executed in accordance with the print instruction is limited. As understood from a description of "8. limit notification" and "9. limit notification" that are illustrated in FIG. 3, the limit notification is provided from the print control server 50 to the gest user U3 via the SNS server 40. The gest user U3 recognizes, via a group chat screen displayed in the terminal device 303, that the print instruction entered by the gest user U3 is rejected, for example.

The limit on the printing may be a limit on the number of sheets to be printed. When a privilege associated with a user ID of a user who has entered a print instruction is the privilege "3", the print controller 53 sets an allowable number of sheets to be printed in one month or an allowable number of sheets to be printed for one print instruction to a smaller number of sheets to be printed than those for the privilege "1" and "2" and prohibits a larger number of sheets than an upper limit on the number of sheets to be printed from being printed.

In addition, when the privilege associated with the user ID of the user who has entered the print instruction is the privilege "3", the print controller 53 may prohibit color printing allowed for the privileges "1" and "2" and execute only monochrome printing.

In the above description relating to FIG. 3, the "print instruction" may be read and interpreted as a "setting instruction", and the "printing to be executed in accordance with the print instruction" may be read and interpreted as "settings to be configured in accordance with the setting instruction". The setting instruction is an instruction to configure various settings relating to the printer 60. The users U can arbitrarily post the setting instruction in the same manner as the posting of the print instruction to the group chat. When a privilege associated with a user ID of a user who has entered the setting instruction is the privilege "1" or the privilege "2", the print controller 53 configures settings relating to a printer 60 associated with the user ID. The settings relating to the printer 60 are, for example, a wide range of settings, such as a setting for a printing quality, a setting for a sheet size, a setting to stop a function included in the printer 60, a setting to release the stop of a function included in the printer 60, and a setting to delete printer identification information from the user DB 55.

When the privilege associated with the user ID of the user who has entered the setting instruction is the privilege "3", the print controller 53 limits a setting to be configured in accordance with the setting instruction and relating to the printer 60. The limit on the setting is the prohibition of a change in at least one of the settings relating to the printer 60. For example, when the setting instruction received by the print controller 53 via the SNS server 40 is an instruction to stop one or more of functions of the printer 60, an instruction to release the stop of one or more of the functions of the printer 60, an instruction to delete printer identification information from the user DB 55, or the like, and a privilege associated with the user ID of the user who has entered the setting instruction is the privilege "3", the print controller 53 rejects the instruction and keeps current settings of the printer 60.

As indicated by the broken-line arrow in FIG. 3, when the print controller 53 limits a setting to be configured in accordance with a setting instruction, the print controller 53 may notify the gest user U3 who has entered the setting instruction that the setting to be configured in accordance with the setting instruction is limited.

When a privilege associated with a user ID of a user who has entered the print instruction or the setting instruction is the privilege "2", the print controller 53 may increase a limit on the printing or the setting, as compared with the case where the privilege is the privilege "1".

3. Conclusion

According to the embodiment, the print control server 50 includes the detector 52 that detects a print instruction entered by a user U in the chat system provided by the SNS or detects a setting instruction entered by the user U in the chat system provided by the SNS, the print controller 53 that executes printing using the printer 60 in accordance with the print instruction or configures a setting relating to the printer 60 in accordance with the setting instruction, and the manager 54 that associates identification information of the user U with a privilege of the user in the chat system and stores the identification information and the privilege of the user. The print controller 53 references the information stored by the manager 54 to identify the privilege associated with the identification information of the user U who has entered the print instruction or the setting instruction. The print controller 53 limits, based on the identified privilege, the printing to be executed in accordance with the print instruction or the setting to be configured in accordance with the setting instruction.

According to the foregoing configuration, the print controller 53 limits the printing to be executed in accordance with the print instruction or the setting to be configured in accordance with the setting instruction, based on the privileges of the users U who participate in the chat system. Therefore, for example, it is possible to limit a gest user who temporarily participates in a chat from freely performing printing and from changing a setting of the printer 60 and to suppress an irregular increase in the cost of printing and a change in a setting of the printer 60.

According to the embodiment, the manager 54 may acquire the association relationships, stored in the SNS server 40 that manages the SNS, between the identification information of the users U and the privileges from the SNS server 40 and store the acquired association relationships.

According to the foregoing configuration, the manager 54 can easily acquire the association relationships between the identification information of the users U and the privileges.

However, the manager 54 may acquire the association relationships between the identification information of the users U and the privileges via a server other than the SNS server 40 without acquiring the association relationships directly from the SNS server 40.

According to the embodiment, the limit on the printing may be the prohibition of the printing or may be a limit on the number of sheets to be printed.

According to the embodiment, the print controller 53 can prohibit one or more of the users U from performing printing via a chat or can limit the number of sheets to be printed.

According to the embodiment, the limit on the setting may be the prohibition of a change in a setting relating to the printer 60.

According to the configuration, the print controller 53 can prohibit, based on the privileges of the users U, one or more of the users U from changing a setting relating to the printer 60 via a chat.

The embodiment discloses not only the print control server but also techniques in various categories, such as a system, a method, and a program.

According to the above description about the print control server 50, the print control method is disclosed. The print control method includes a detection process of detecting a print instruction entered by a user U in the chat system provided by the SNS or detecting a setting instruction entered by the user U in the chat system provided by the SNS, a print control process of executing printing using the printer 60 in accordance with the print instruction or configuring a setting relating to the printer 60 in accordance with the setting instruction, and a management process of associating identification information of the user U with a privilege of the user in the chat system and storing the identification information and the privilege of the user. The print control process references the information stored by the management process to identify the privilege associated with the identification information of the user U who has entered the print instruction or the setting instruction. The print control process limits, based on the identified privilege, the printing to be executed in accordance with the print instruction or the setting to be configured in accordance with the setting instruction.

What is claimed is:

1. A print control server comprising:
    a detector configured to detect a print instruction entered by a user in a chat system provided by a social networking service (SNS) or a setting instruction entered by the user in the chat system provided by the SNS;
    a print controller configured to execute printing using a printer in accordance with the print instruction or configure a setting relating to the printer in accordance with the setting instruction; and
    a manager configured to associate identification information of the user with a privilege of the user in the chat system and store the identification information and the privilege of the user, wherein
    the print controller is configured to reference the information stored by the manager to identify the privilege associated with the identification information of the user who has entered the print instruction or the setting instruction in a chat system, and limit, based on the identified privilege, the printing to be executed in accordance with the print instruction or the setting to be configured in accordance with the setting instruction.

2. The print control server according to claim 1, wherein the manager is configured to acquire, from the SNS server that manages the SNS, an association relationship, stored in the SNS server, between the identification information and the privilege and stores the acquired association relationship.

3. The print control server according to claim 1, wherein the limit on the printing is prohibition of the printing.

4. The print control server according to claim 1, wherein the limit on the printing is a limit on the number of sheets to be printed.

5. The print control server according to claim 1, wherein the limit on the setting is prohibition of a change in the setting relating to the printer.

6. A print control method comprising:
    a detection step of detecting a print instruction entered by a user in a chat system provided by a social networking service (SNS) or detecting a setting instruction entered by the user in the chat system provided by the SNS;
    a print control step of executing printing using a printer in accordance with the print instruction or configuring a setting relating to the printer in accordance with the setting instruction; and
    a management step of associating identification information of the user with a privilege of the user in the chat system and storing the identification information and the privilege of the user, wherein
    the print control step references the information stored by the management step to identify the privilege associated with the identification information of the user who has entered the print instruction or the setting instruction in the chat system, and limits, based on the identified privilege, the printing to be executed in accordance with the print instruction or the setting to be configured in accordance with the setting instruction.

\* \* \* \* \*